United States Patent [19]

Trumbull et al.

[11] 4,044,904
[45] Aug. 30, 1977

[54] METHOD OF FEEDING PARTICLES FROM A FIRST REGION TO A SECOND REGION

[75] Inventors: Harold E. Trumbull; Dean F. Poeth, both of Columbus, Ohio

[73] Assignee: Battelle Memorial Institute, Columbus, Ohio

[21] Appl. No.: 607,203

[22] Filed: Aug. 25, 1975

[51] Int. Cl.² .............................................. B65G 65/30
[52] U.S. Cl. .................................. 214/152; 48/86 R; 201/6; 214/17 B; 214/18 R; 214/23
[58] Field of Search ................. 214/17 B, 18 R, 18 V, 214/23, 152; 48/197 R, 72, 86 R, 101, 201, 202; 264/29; 201/5, 6, 22, 24; 44/10 C, 13

[56] References Cited

U.S. PATENT DOCUMENTS

| | | | |
|---|---|---|---|
| 1,217,554 | 2/1917 | Begemann | 48/86 R |
| 1,866,730 | 7/1932 | Sperr | 48/202 |
| 2,151,514 | 3/1939 | Heinen | 214/152 |
| 3,384,467 | 5/1968 | Ammann et al. | 48/197 R |
| 3,559,823 | 2/1971 | Ostrin | 214/17 B |
| 3,637,464 | 1/1972 | Welsh et al. | 44/10 C |
| 3,756,434 | 9/1973 | Teske | 214/17 B |
| 3,933,443 | 1/1976 | Lohrmann | 44/10 C |
| 3,939,297 | 2/1976 | Ayland et al. | 214/18 V |

FOREIGN PATENT DOCUMENTS

| | | | |
|---|---|---|---|
| 229,634 | 1/1959 | Australia | 48/197 R |
| 262,901 | 12/1926 | United Kingdom | 214/17 B |

Primary Examiner—Trygve M. Blix
Assistant Examiner—Edward R. Kazenske
Attorney, Agent, or Firm—Philip M. Dunson; C. Henry Peterson

[57] ABSTRACT

Methods of conveying solid particles via an elongate tube from a supplying region at one pressure to a receiving region at a substantially different pressure. Movable sealing zones, comprising mixtures of solid particles and liquid, contact the inner wall of the tube and are carried along with the particles when forced by a ram from the tube into the receiving region. While the particles and sealing zones are being conveyed into the tube, a gate or an auger at the receiving region may substantially seal it from the tube. Typically the sealing zones are formed as thin disks or annular layers of fine coal particles and oil, where discrete coal charges are fed into a gasifier unit.

3 Claims, 8 Drawing Figures

U.S. Patent   Aug. 30, 1977   Sheet 1 of 2   4,044,904
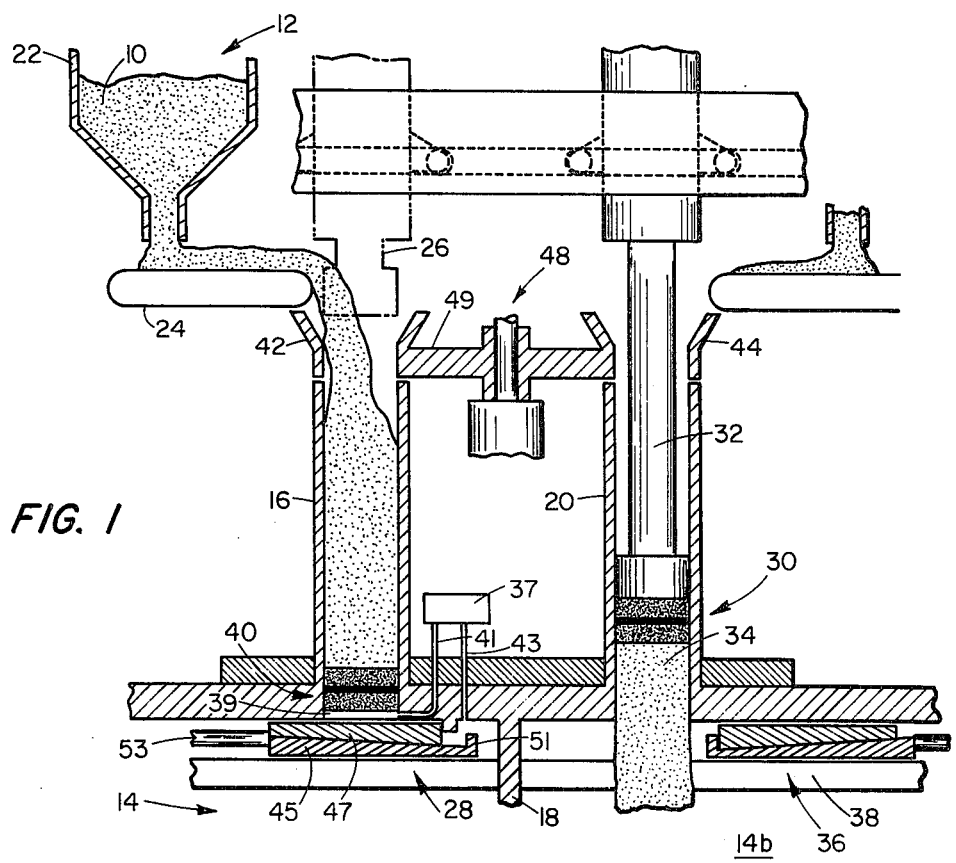
FIG. 1
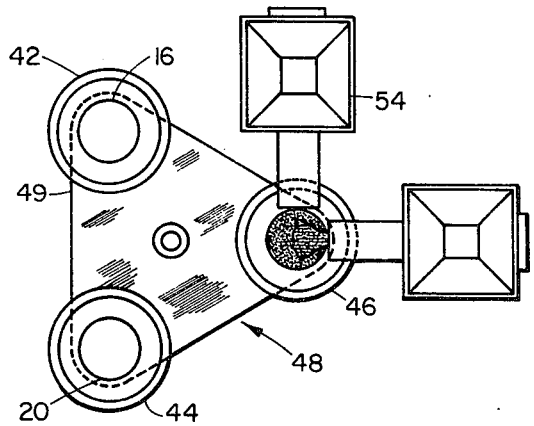
FIG. 2
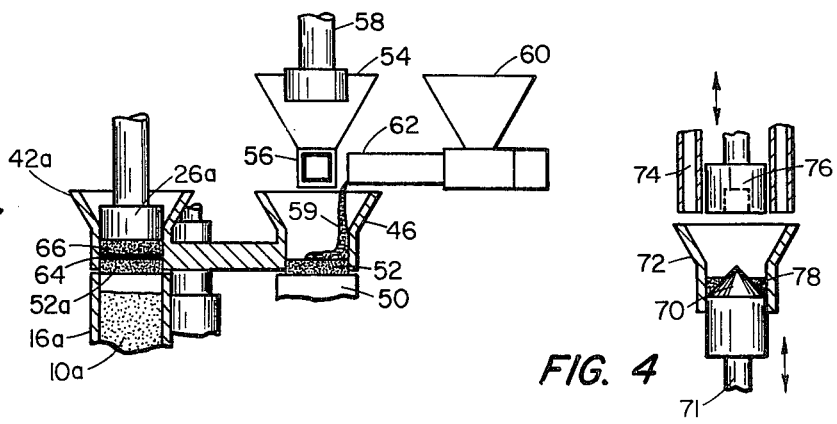
FIG. 3
FIG. 4

METHOD OF FEEDING PARTICLES FROM A FIRST REGION TO A SECOND REGION

RELATED APPLICATIONS

Subject matter disclosed but not claimed herein is disclosed and claimed in the copending application Ser. No. 607,336 of Harold E. Trumbull and Ronald F. Hartung for "Particle Feeding", filed concurrently and commonly assigned.

BACKGROUND AND SYNOPSIS

This invention relates to methods for transferring solid materials between regions of substantially different pressures, and more particularly it relates to the use of movable pressure seals, formed from a mixture of solid particles and liquid, that can be transferred along with the solid material from one region to the other.

The methods of the present invention are typically useful in coal gasification plants, for the purpose of feeding particulate coal from an external region under atmospheric pressure into an interior region of a gasification unit where pressures on the order of 1 to several thousand pounds per square inch gauge or more prevail. Likewise the invention makes possible improved techniques for removing hot char from a high-pressure interior region to a disposal system operating at ambient atmospheric pressure.

A number of different techniques intended to accomplish purposes somewhat similar to the foregoing results have been employed or proposed in the past. According to U.S. Pat. No. 1,974,789, materials in solid particulate form, which may be mixed with liquids, are carried in a moving chamber formed between two pistons that reciprocate together within a cylinder extending between the high and low pressure regions. While the two regions are nominally sealed off from each other by the piston rings, the moving chamber itself tends to exchange the atmospheric constituents of the two regions, and it is not likely that the piston ring seal can be effective for any substantial length of time when the cylinder and ring surfaces are subjected to the abrasive action of a solid material such as coal.

Another old proposal is contained in British Patent Specification No. 262,901, which discloses the concept of a continuous, elongated and intermittently moving stopper formed from the particulate solid material per se which is being transferred between the two pressure regions. A reciprocating plunger periodically compresses and moves forward additional quantities of the solid material which is thereby extruded under high pressure through a tubular passage extending between the two regions. This arrangement depends on the tightly packed condition of the material within the tube to prevent blow-out of the stopper when the plunger moves backward to admit another charge of material, and hence requires extremely high pressures and high power consumption by the extrusion apparatus. The patent discloses that the formation of a gas-tight stopper can be assisted by adding to the solids a suitable substance which will cause the solids to cake together to form a tight core, or by introducing into the tube at intervals tight layers of materials such as rubber, paper, cardboard or metal whereby the body of the stopper can be made gas tight. Unfortunately it appears that these extrinsic layer materials, even if physically or chemically compatible with the process, either cannot be made to form an effective seal at the inner wall of the tube, or are destroyed by the high pressure and abrasive action of particles such as coal.

In the operation of modern coal gasification units, two main techniques are used for coal feeding. One technique utilizes bulk transfer of dry coal through a lock hopper system, as described by E. J. Ferretti, "Feeding Coal to Pressurized Systems", *Chemical Engineering,* Dec. 9, 1974. The other technique involves continuous feeding of fine wet coal into the system by means of a slurry pump. These two techniques are subject to substantial energy losses.

The present invention provides methods for feeding solid particles from a first region at a first pressure, for example atmospheric pressure, to a second region, which may be the interior of a closed reaction vessel, where a second pressure, perhaps on the order of one thousand psig or greater, prevails. The particles are conveyed into an elongate tube which is connected to communicate between the first region and the second region. In order to minimize any leakage or interchange of their fluid contents between the two regions, for example, the escape of gas from a highly pressurized region, this invention provides a movable sealing zone in the tube. This zone comprises a mixture of solid particles and a liquid contacting the inner wall of the tube. The particles are then forced from the tube into the second region, carrying a sealing zone along with them.

The invention will be illustrated and described in the context of a coal gasification plant, as noted above, for feeding coal to the gasification unit and for removing char therefrom. However, it is apparent that the methods and apparatus have utility in any other arrangement where it is necessary to transfer particulate solids from a region of low pressure to one of high pressure or vice versa.

The use of the solid particles and liquid sealing zone enables a leak-tight seal to be made, between a column of particles being fed and the inner wall of the tube, and such a tight seal can be effected with reduced pressure in comparison with prior arrangements, thus reducing the power consumption of the mechanical feed mechanism. The liquid sealing zone can economically use a hydrocarbonaceous liquid such as lubricating oil or crude oil, which reduces friction and likewise power consumption while at the same time reducing wear on the tube and the ram or plunger which is preferably employed therein to move the column of particles. This arrangement has an obvious energy-conservation advantage over the water-slurry feeding method in that the substantially unrecoverable energy required to vaporize the water does not have to be consumed, whereas the energy contained in the oil is fully recovered in the gasifier product.

Finally, the use of the oil, which may be a petroleum product, can be reduced to a very low level by forming the zones along only very short segments of the column of particles being conveyed, such segments constituting only a very minor portion of the length of the column. Also, the solid-liquid mixture in the zones may be formed only around the periphery of the column, so that the volume of solid-liquid mixture used is only a very small fraction (typically about 0.2%) of the gasifier volume of material being fed into the fasifier. Since this small fraction itself may contain only around one part in 10 or less of the oil, the economy of oil use is evident.

According to some of the more detailed aspects of the invention, seal plugs or rings, compression-molded from the mixture of solid particles and liquid, can be prepared outside the injection tube and transferred to the tube before the coal or other solid particles are to be forced from the tube into the second region. The plugs or rings thereby form sealing zones of relatively small extent along the length of the tube which is otherwise filled with the bulk of the dry working particles being fed through the tube.

A substantially fluid tight seal, typically comprising a gate or an auger, may be provided between the second region and at least a substantial portion of the tube communicating with the first region while particles are being conveyed from the first region into the tube. One of the above-described seal rings or plugs normally occupies the portion of the tube at the end communicating with the second region while the particles are being conveyed into the tube from the first region. The gate or auger assists in retaining the seal ring or plug in place during this operation, preventing disruption of the movable sealing zone and consequent leakage of gas from the high pressure region to the low pressure region. The gat or auger also allows the formation of a leak-tight sealing zone, or gas-tight stopper, in the injection tube, utilizing a relatively very low pressure operation of the ram or plunger by comparison with the pressures which would be required using the methods and apparatus of the prior art.

Typically the gate or the auger cooperates with the ram or plunger to effect precompression of the bulk of the particulate material within the tube before the material is forced from the tube into the second region. This also results in the conjunction of a substantially high pressure to the solid-liquid seal ring or plug, expanding it laterally and squeezing its periphery outwardly into tight sealing engagement with the bore of the injection tube, before any sealing action is required of the seal ring or plug. The ram may be vented to cooperate with the seal ring so as to allow gas pressure, built up within the bulk material as a result of the precompression, to escape through the vent and the opening in the seal ring, rather than exerting pressure against the seal.

Further according to the invention we have discovered certain satisfactorily operational and preferred ranges of values for certain parameters of the seal-forming process, particularly as adapted for the injection of coal into coal gasification units. These parameters include sealing zone particle sizes, tube wall contact length, solid particles to liquid ratios in the sealing zone, operating pressures within the reactor which permit most effective sealing, seal liquid viscosity, and bulk coal particle sizes, as discussed herein.

Some objects of the invention are to provide improved methods and apparatus for feeding solid particles from one region to another region at a substantially different pressure without loss of fluid from the high pressure region or substantial commingling of the fluids in the two regions, to provide such a method and apparatus which can substantially reduce the consumption of energy required by both the feeding operation and the ordinary operation of the process, to provide moving seals comprising solid particles and a liquid which can be injected from the one region to the other along with the solid particles without substantially interfering with the operation of the process utilizing the particles, to provide a way of sealing an injection tube connected to communicate between the regions with maximum economy of the liquid used to form the seals and to lubricate the injection tube, to provide a way of forming a leak-tight seal between a moving column of dry particles and the injection tube which requires relatively low pressure from a ram or the like which is utilized to move the column, to provide improved methods and apparatus for feeding essentially dry coal into a gasification unit and for removing hot char therefrom, to provide improved gating arrangements for substantially leak-proof transport of solid particles between regions at different pressures and to provide an arrangement whereby a column of relatively loose particles can be precompacted before injection while minimizing detrimental effects on the seal due to gas pressure build up as a result of compaction of the particles.

SUMMARY

A typical method according to the present invention for feeding solid particles from a first region at a first pressure to a second region at a substantially different second pressure, comprises conveying particles from the first region into an elongate tube connected to communicate between the first region and the second region, providing a movable sealing zone in the tube comprising a mixture of solid particles and liquid contacting the inner wall of the tube, and forcing the particles from the tube into the second region. Typically the solid particles are moved through the tube in a column, and the seal forming step comprises forming a layer of the mixture in the tube, expanding the layer laterally to press its periphery into tight sealing engagement with the tube, and utilizing the layer as a segment of the periphery of the column being moved from the first region to the second region while forming a pressure seal between the two regions.

The expansion step typically comprises compressing the layer in the direction of movement of the column. Typically the layer portion extends along a minor part of the length of said column, and the other part of the length of the column of particles constitutes the major part of the length thereof. The method typically comprises molding portions of the mixture of solid particles and liquid into coherent bodies externally of the tube, and thereafter inserting the bodies into the tube to form the layers.

Typically the seal forming step further comprises blocking the flow of material downstream of the layer, and exerting pressure against the layer to force the mixture into tightly sealing engagement with the tube, and the forcing step includes unblocking the flow of material to permit the particles to be forced from the tube into the second region; typically relieving forces in the region where the flow is blocked before unblocking the flow.

The layer typically is formed either as an annular layer only around the periphery of the column, or as a disc-shaped plug extending over an entire cross section of the column. The method typically comprises forming an additional layer of substantially dry particles, of the type contained in the mixture, contiguous to the plug layer at least on the side thereof facing the first region, and may comprise forming such a layer on each side of the plug layer.

Typically the conveyed particles comprise particulate coal; the solid particles in the mixture also comprise particulate coal including particles smaller than the major portion of the conveyed particles; and the liquid comprises a hydrocarbonaceous material, such as oil or other lubricant; or the liquid may comprise water.

The mixture in the sealing zone typically comprises particles in the size range of about −20 mesh, with at least about 30 percent of the particles in the mixture in the size range of about −100 to −200 mesh. The sealing zone typically comprises also, adjacent to the mixture on the lower pressure side, a layer of particles predominantly in the size range of about −20 mesh compacted at a pressure of about 1,000 to 2,000 psi, with at least about 30 percent of the particles in the mixture in the size range of about −100 to −200 mesh. Typically the particles adjacent to the mixture are similar in composition to those in the mixture and to the particles to be fed from the first region to the second region. The mixture typically comprises about 7 to 25 percent liquid by volume. Typically the sealing zone comprises a layer about 1 to 3 inches thick adjacent the inner wall of the tube and extending over at least an annular region from the inner wall of the tube to a circle having a diameter about 2 inches less than the inner diameter of the tube.

Typically the forcing comprises pressing a solid surface from the portion of the tube communicating with the first region toward the movable sealing zone to push the particles in the tube toward the portion of the tube communicating with the second region and from there into the second region. The solid surface typically is pressed by a reciprocating plunger. The method typically comprises forming a succession of sealing zones in the tube and allowing at least one sealing zone to remain in the tube when the particles are forced from the tube into the second region, conveying a further quantity of the solid particles from the first region into the tube on the side of the seal remaining in the tube that faces the first region, and then forming another sealing zone in the tube adjacent to the further quantity of solid particles, and on the side thereof next to the first region.

Typically a substantially fluid-tight seal is provided between the second region and at least a substantial portion of the tube communicating with the first region while particles are being conveyed from the first region into the tube. The method typically comprises closing a gate between the second region and the tube portion to provide a substantially fluid tight seal, compressing a sealing zone and the conveyed material in the tube while the gate is closed, venting the tube while the material is being compressed, and then opening the gate before forcing the particles into the second region. Alternatively, the method may comprise placing a plurality of sealing zones in the tube to provide the substantially fluid-tight seal and removing at least one sealing zone from the tube when the particles are forced from the tube into the second region. This typically comprises boring into the sealing zone and the particles with an auger and then retracting the auger into the second region. Typically the auger is reciprocated axially in the tube, in a predetermined relation to the movement of the particles being forced through the tube toward the second region. This typically comprises moving a solid surface axially against a sealing zone and particles between the auger and the first region in synchronism with the retraction of the auger.

DRAWINGS

FIG. 1 is an elevational view of a dry coal feeding apparatus according to the invention.

FIG. 2 is a plan view of the apparatus of FIG. 1.

FIG. 3 is a sectional view of a portion of the apparatus of FIGS. 1 and 2, with some movable portions in a different position.

FIG. 4 shows a modification of a portion of FIG. 3.

DETAILS

Figure 6:
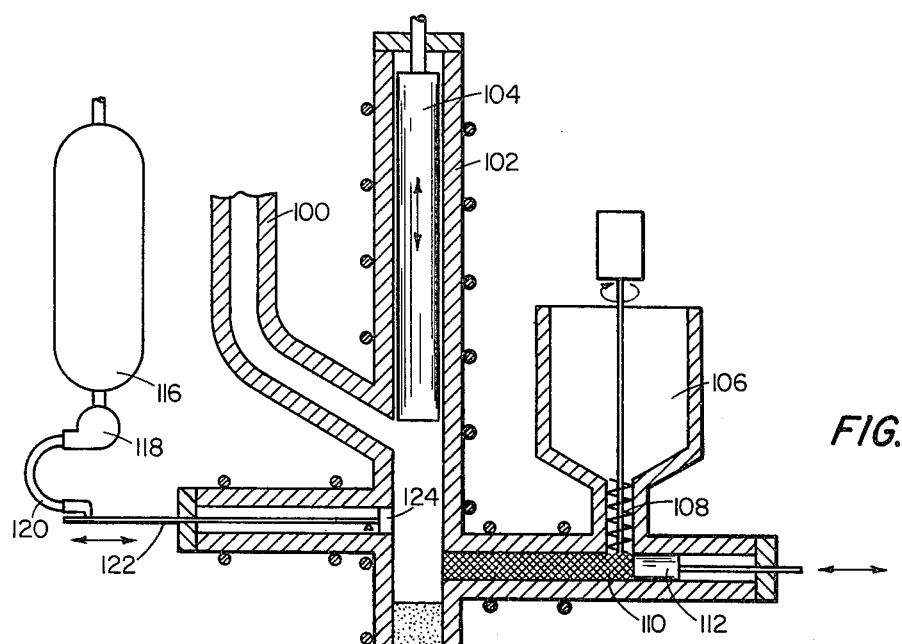
FIG. 6 is a sectional view showing an apparatus according to the invention for unloading hot char from the interior of a coal gasification unit.

Referring now to FIGS. 1, 2 and 3, there is shown an apparatus for feeding solid particles 10 of dry coal from a first region 12 at atmospheric pressure into a second region 14 at substantially higher pressure. The second region 14 typically is within the fuel supply antechamber of a gasifier unit, and may contain a gas pressure on the order of 1000 psig or higher.

Connected to communicate between the first and second regions 12, 14 is an elongate tube 16. The second region 14 is divided into right and left hand sections by a dividing wall 18. The right hand section is adapted to be fed through a second elongate tube 20 identical with the tube 16. Each of the two halves of the region 14 can be individually sealed off in case the feeding apparatus associated with one tube is shut down for some reason, so that the gasification unit can still operate with the coal supplied by the operable feeder.

The particulate coal 10 is supplied by a hopper 22, from which it is transferred into the injection tube 16 by a conveyor 24. When the injection tube 16 has been filled, the particles of coal 10 are forced from the tube 16 by a ram 26. A gate 28 (comprising parts including parts 45, 47, and 51 to be described hereinafter) provides a substantially fluid-tight seal between the antechamber region 14 and at least a substantial portion of the tube 16 communicating with the first region 12, except when the ram 26 is being operated to force the coal into the antechamber. Hence the gate 28 is in the closed position as shown while the coal particles 10 are being conveyed by a conveyer 24 from the first region 12 into the tube 16. As indicated in FIG. 1, a similar ram 32, hopper, conveyer, and gate 36 are associated with the second injection tube 20.

As shown in FIG. 1, a movable sealing zone 30 has been provided in the tube 20, and at the point shown in the operation of the apparatus, the ram 32 within the cylinder 20 is moving downwardly, pushing the moving sealing zone 30 ahead of the ram 32 together with the bulk coal 34 being injected into the second antechamber portion 14b. The right-hand gate 36 is open at this time to allow the bulk coal 34 to be injected into the antechamber 14b. The gate 36 is movable between its open and closed positions on gate support rails as at 38.

In the operation of the apparatus, the ram plunger 32 continues to move downwardly until the moving seal 30 is at the same level as a similar seal 40 shown beneath the bulk coal in the injection tube 16. At the end of the downward motion of the ram 32, when the movable sealing zone 30 has reached the level of the sealing zone 40, the gate 36 is closed, thus providing a substantially fluid-tight seal between the high pressure region 14b and the atmospheric pressure region 12 while the ram 32 is being raised and while the tube 20 is being refilled with coal 10. The gates as at 28 not only seal off the bottom ends of the injection tubes, but also support the seals, as at 40, if need be, when the tubes are being filled.

Specific provisions are made for relieving forces acting against a gate as at 28 and 36 before the gate is opened. These forces arise when there is an unbalance between the pressures acting on opposite sides of a gate. Since the pressure in the region 14 may exceed the pressure in the region 12 by 1000 psig or more, and since this pressure may act on an area of the gate at least as large as the area of a typically 24-inch diameter tube as at 16, substantial forces are involved.

The force exerted against the bottom of the gate 28 by the gas pressure in the region 14 is relieved before the gate is opened by operation of a valve 37. When the valve 37 is operated, its opens a passageway to interconnect the high-pressure region 14 and the space 39 at the end of the tube 16 directly above the gate 28. The connection is completed through gas-bleed tubes 41 and 43. The valve 37 is normally closed except immediately before and during the time that the gate 28 is being moved in either the opening or the closing direction.

Force exerted against the top side of the gate 28, some of which force may be transmitted from the ram 26 through the non-gaseous material in the tube 16 including the body of the seal 40 as a result of a precompacting operation to be described hereinafter, is relieved to a great extent before the gate 28 is opened by the action of the gate mechanism. This mechanism comprises a pair of wedge-shaped portions 45 and 47. The portion 47 is used to close off the end of the tube 16, whereas the portion 45 is an actuator portion to effect the desired motion of the portion 47 when the gate 28 is being opened or closed. The portion 45 is secured to an actuator rod 53 and carries an upstanding cleat or flange 51.

In the operation of the gate 28 to open it, the wedge portion 45 moves to the left in FIG. 1, sliding along the bottom of the wedge portion 47 which is thereby lowered somewhat initially due to the decreased thickness of the support under it. This initial lowering of the portion 47 is highly desirable in order to prevent dragging of the gate 28 across the face of the seal 40. After the portion 47 is lowered, it is caught by the flange 51 and moved to the open position as further movement of the actuator rod 53 and the wedge portion 45 takes place. When the gate 28 is being closed, after the closing portion 47 has been moved to the right, it is again raised into tight sealing position under tube 16. Of course the mechanism of the gates 28 and 36 may be simple or it may be as elaborate as is necessary to meet the requirements of a particular particle transfer operation. The gates 28 and 36 are of similar or identical construction, and the gate 36 of course has an associated bleed tube and valve arrangement similar to that at 37, 41, 43 as described in connection with the gate 28.

The formed sealing zones 30 and 40 are occupied by sealing plugs which are compression-molded, using apparatus which is to some extent auxiliary to the coal feeder and injection apparatus. This auxiliary apparatus includes a turret mechanism 48 with three seal carriers 42, 44, 46 mounted on a turntable 49 arrangement.

The forming of a seal plug in the carrier 46 is illustrated by FIGS. 2 and 3. The bottoms of the seal carriers are open, but in the position shown the carrier 46 is provided with a temporary bottom as it is positioned over an anvil 50. A layer of finely ground coal 52 has been placed in the carrier 46 via a hopper 54 and a conveyor 56. This layer 52 has also preferably been compacted by the action of a ram 58.

At the point in the operation illustrated, a layer of paste 59 comprising a mixture of a liquid (typically oil) and powdered coal, is being placed in the carrier 46 via a hopper 60 and a conveyor 62. A third layer, similar to the layer 52 is then to be placed on top of the paste mixture and the whole is to be compressed into the carrier by ram 58. The result is a sandwich-like seal plug formed with three layers, 52a, 64, and 66 as shown at the left side of FIG. 3 where the completed seal plug is being pressed out of a carrier 42a and into an injection tube 16a.

In a typical operating sequence, after the injection tube 16 has been loaded and the tube 20 has been discharged, the ram 32 is withdrawn from the tube 20 and the carrier 44. The turret mechanism 48 is then indexed to the next position such that the just-loaded carrier 46 is moved to the position of the carrier 42, over the just-filled tube 16. Due to the compressed state of the seal plug in the carrier 46, it constitutes a coherent body, and does not fall out of the carrier as the carrier moves away from the anvil 50. With the carrier 46 positioned over the tube 16, the ram 26 is actuated, pressing the seal plug 52a, 64, 66 out of the carrier 42a and into the injection tube 16a on top of the charge of coal 10a, as is best shown in FIG. 3. The injection tube 20 is filled and the new seal plug is being made in the carrier 44 while the tube 20 is being filled and the tube 16 is being discharged.

In the case of the seal plugs 52a, 64, 66 formed by the apparatus best shown in FIG. 3, the bottom layer 52a of ground coal is meant to provide a cushion for the paste layer 64 against the bulk coal 10a. The top layer of coal particles at 66 prevents the paste mixture in the layer 64 from being extruded past the ram head 26a.

Satisfactory seal plugs of the three-layer variety have been made using −200 mesh ground coal for the layers 52a and 66, with the middle layer 64 consisting of a mixture of five parts of the −200 mesh ground coal to one part of 50-W motor oil.

Figure 5:
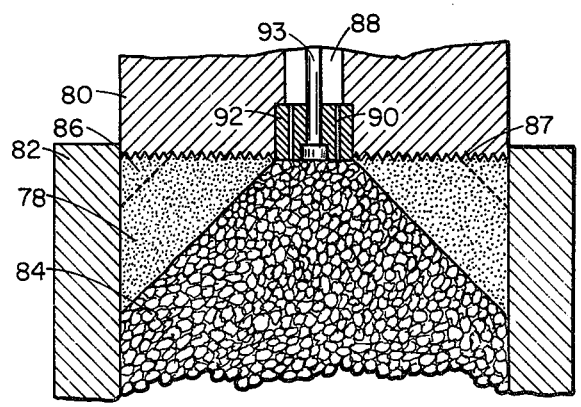
FIG. 5 is a sectional view of a portion of the apparatus of FIG. 1, showing a modification.

FIG. 4 shows how the seal-molding apparatus can be modified to mold an annular seal 78 which is adapted to extend only around the inner periphery of an injection tube as at 82 in FIG. 5. As shown in FIG. 4, the fixed flat anvil 50 of FIG. 3 is replaced by a conical-shaped ram head 70. When a ram 71 is actuated to move to its upward position, the ram head 70 enters the bore of the seal carrier 72. A modified paste mixture is extruded through an annular orifice 74 so that it falls into the funnel portion of the carrier 72 to form a ring-shaped heap of paste around the cone-shaped head 70 of the ram. A second ram head 76 which passes through the center of the annular orifice 74 is adapted to move down over the cone-shaped head 70 of the first ram. Thereby, the paste mixture is tamped around the cone to form a compacted annulus 78 with a triangular-shaped cross section.

The paste mixture is substantially modified from that previously described in connection with FIG. 3. Satisfactory seal rings have been made, using, for example, a mixture of −200 mesh and −20 mesh coal in equal parts. This mixture of coal particles was made into a relatively dry paste mixture containing 10 parts of coal by volume to one part of 50-W motor oil or 42-ssu viscosity crude oil. The −20 mesh particles constitute aggregates with the spaces therebetween filled with the −200 mesh coal and oil mixture. The seal rings 78, like the seal plugs 52a, 64, 66 formed by the apparatus of FIG. 3, form coherent bodies in the carrier 72 and remain in the carrier after the conical ram head 70 has been retracted to a position below the carrier.

FIG. 5 shows a modified ram head 80 which is used to press the seal rings 78 out of the carrier and into the top of the injection tube 82 after the tube has been filled with a coal charge 84.

Once the seal ring 78 has been inserted into the tube 82, it is expanded laterally by the pressure of the ram head 80 in the direction of movement of the coal charge. The expansion of the seal ring 78 around its periphery forces the ring into tight sealing engagement with the inner wall of the tube 82. Although the paste mixture is sufficiently fluid under the pressure to permit its lateral expansion, the use of the drier mixture has been found experimentally to be sufficient to prevent a substantial amount of the paste from being extruded into the clearance space (typically 0.020 inch) between the tube 82 and the ram head 80. However, if necessary, the seal ring 78 can be formed in two layers by the addition of a ring of −20 mesh dry coal in the region 86, shown separated from the region 78 by the dashed lines.

To increase the surface contact area of the ram head 80, it has been found appropriate to groove the face of the ram head, leaving about 60° triangular-shaped lands 87 thereon.

As indicated above, in one mode of operating the apparatus one of the gates 28 or 36 is closed under the injection tube and the coal charge is compressed against the barrier formed by the gate until the seal ring has been fully expanded into sealing engagement with the tube. This tends to assure that the seal will be well-formed and tight before the gate is opened and subjected to the pressure within the antechamber. It has been found, however, that this precompaction of the coal charge also results in compression of air which is trapped in the interstices of the coal and the air under pressure may have a detrimental effect on the formation of the seal.

If the conditions are such that this causes difficulty, the ring seals permit using a modified ram head which can be vented to the atmosphere during the precompaction of the coal charge. The venting is accomplished through a central bore 88, in the ram head 80, which communicates with the region under the cam head 80 through drilled passageways 90 in a filter plug 92 which is mounted in a step-bored opening in the bottom of the ram head 80 and retained therein by a bolt 93. The passage 88 is vented to the atmosphere through a suitable valve arrangement not shown which is closed except when the coal charge 84 is being precompacted. By this arrangement, the air pressure built up by the compression of the coal charge is relieved so that the seal is not prematurely subjected to the air pressure. Moreover, the venting procedure minimizes contamination of the gaseous content of the reaction vessel.

FIG. 6 shows an arrangement whereby the method of the present invention can be used to remove hot char from the interior region of the coal gasification reaction vessel. The solid particles of char are conveyed into a side tube 100 whence they are able to fall into an ejection tube 102 when a piston 104 therein is raised. After the particles 103 have been compacted in the tube 102 by downward movement of the piston 104, a seal is formed on top of the charge.

Figure 6A:
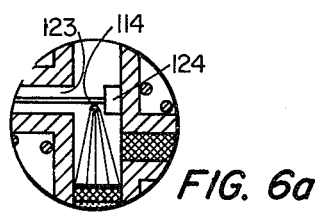
FIG. 6a is an enlargement of a portion of FIG. 6 showing parts thereof in a different position.

Again the seal is formed from a mixture of solid particles and liquid. The dry particles are moved from a receptacle 106 by means of an auger 108 and fed into a passageway 110 when a piston 112 is retracted. When the piston 112 moves forward, a quantity of dry particles from the passage 110 is dropped into the injection tube 102 on top of the column of char 103. A layer of liquid is added through a spray nozzle arrangment 114 which is best shown during the liquid discharge operation illustrated in FIG. 6a. The liquid is fed from a supply container 116 and moved by a suitable pump 118 through a movable connection 120 and into a reciprocable tube 122 on which the spray nozzle arrangement 114 is mounted. The movement of the tube 122 allows the spray nozzle arrangement 114 to be retracted into an opening 123 in the side wall of the injection tube 102, which opening is closed off by a plug 124 when the spray nozzle 114 is not in use. Another layer of dry particles is then injected on top of the oil-sprayed layer by a second operation of the piston 112. The result is a three-layer seal plug 126 similar to that formed by the apparatus of FIG. 3

In the apparatus of FIG. 6, the column of compacted char particles is shown to contain three segments of the dry particles with the segments separated by the sealing zones as at 126. These multiple sealing zones cooperate with the action of an auger 128, whose purpose is similar to that of the gate 28 or the gate 36 of FIG. 1, but is unable to effect a fluid-tight seal without the synergetic action with one or more of the sealing zones 126.

Figure 6B:
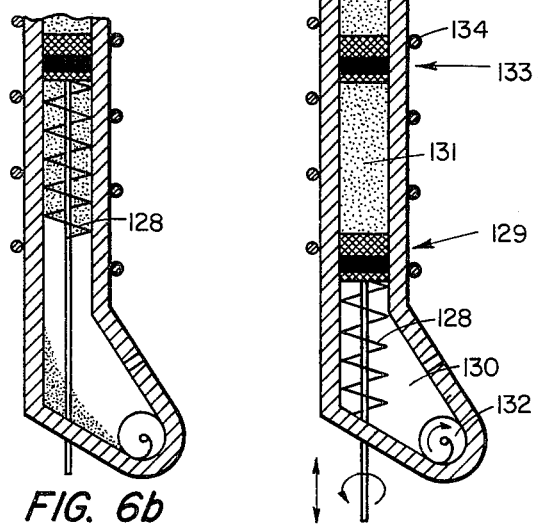
FIG. 6b shows a portion of FIG. 6 with parts thereof in a different position.

The auger 128 both rotates and reciprocates, as shown by the moved position of the auger in FIG. 6b. The operating sequence is that when the piston 104 is raised, the auger 128 is also moved upwardly to the position shown in FIG. b. When the piston 104 presses a new charge of the char particles into the tube 102, the auger 128 moves down, exerting a restraining pressure against the moving column of particles and preventing a possible blowout at the bottom of the injection tube 102. The auger 128 is then moved upwardly, rotating meanwhile to chew out the bottom seal plug 128 and the compressed char 131 below the next seal 133 thus moving the char, either during the chewing and boring operation or during the subsequent downstroke of the auger, or during both operations, into a chamber 130 whence it can be moved by a screw conveyer 132 to a disposal place. The chamber 130 in this case is in a second region at atmospheric pressure.

Since the apparatus of FIG. 6 is adapted to be located in the hot part of the gasification reactor, cooling coils as at 134 are employed to cool the ejection tube 102 and other parts which require cooling. Such cooling is not normally required for the apparatus of FIGS. 1 and 2, since this apparatus can be located in a coal supply area remote from the high-temperature part of the reactor.

As noted hereinabove, satisfactory values for a number of operating parameters of the present process have been determined, particularly for coal particle transfer applications.

Coal particles with a longest dimension of up to 2 inches can be fed if a moderate amount of crushing can be tolerated. Fine (−200) mesh coal can also be fed.

As given herein, a mesh size preceded by a minus sign (e.g., −200) means coal of any size that will pass through a screen of the specified mesh size (e.g., smaller than 20 mesh screen).

The solid particles of the mixture in the sealing zone are typically in the size range of about −20 mesh. At least about 30 percent of the particles are typically in the size range of about −100 to −200 mesh. The particles are typically compacted at a pressure of about 1,000 to 2,000 psi. The mixture typically contains about 7 to 25 percent liquid by volume. Although satisfactory seals have been formed using water, a better lubricant such as oil with a higher viscosity provides better seals and better lubrication of the parts to reduce friction and minimize wear on the moving parts. Alternatively a suitable polymer can be used. Motor oil of 50-W forms a better seal than 42-ssu crude oil.

To reduce friction and wear, as well as to help make the moving seals leakproof, it is our presently recommended practice to lubricate the inner walls of the injection tubes 16 and 20 of FIG. 1, as well as the tube 102 to FIG. 6, in the coal charge or char-receiving region before each charge of coal or char is conveyed into the tube. The oil spray arrangement using the nozzle 114 of FIG. 6 can be used for this purpose, in addition to its regular function of wetting the powdered coal layer with oil. A similar arrangement can be incorporated in the apparatus of FIG. 1.

The sealing zone typically comprises a layer of the liquid and solid particle mixture about 1 to 3 inches thick adjacent the inner wall of the tube. The sealing zone typically extends over at least an annular region from the inner wall of the tube to a circle having a diameter about 2 inches less then the inner diameter of the tube. It appears that for practical purposes these dimensions are substantially independent of the particular tube diameter.

Although process conditions may limit the choice of the pressures in some cases, it has been found that when there is a pressure difference between the two regions of 1,000 psig or more, better seals can be formed than can be formed with a pressure difference of 500 psig, for example, and hence higher pressures appear to facilitate better sealing.

In order to evaluate the effect of changing parameters in the design and use of the annular seals 78 of FIGS. 4 and 5, a group of experiments has been performed utilizing a leak testing arrangement to determine the length of time a formed seal will hold against the operating pressure difference between two regions.

The statistical analysis used to evaluate the data of the experiments is called a $2^{7-4}$ fractional factorial design (Cochran, W.G., and Cox, G. M., *Experimental Design*, 2nd ed, John Wiley and Sons, New York (1957) pp 244–292. The notation $2^{7-4}$ is interpreted as a two-level design with seven variables, four of which are mixed with interactions of the other three variables.

The purpose of this analysis was to determine the influence of the seven variables on the seal time of the coal ring. The variables and their operating levels are listed in Table 1. The experimental design which described the conditions of each run is displayed in Table 2. The first three columns from experiments 1 to 8 inclusive were generated according to standard factorial design. The remaining columns were generated from combinations of the first three. Experiments 9 through 16 represent the mirror image design of the first eight which allowed clear significance estimates of the variables to be calculated. The response of each test is listed under seal time in Table 2.

TABLE 1.

| THE SEVEN VARIABLES FOR THE GROUP II EXPERIMENTS | | | |
|---|---|---|---|
| | Variable | −1 Level | +1 Level |
| $X_1$ | Compaction pressure (psi) | 2000 | 3000 |
| $X_2$ | Ram vent | Open | Closed |
| $X_3$ | Sealing fluid viscosity (ssu) | 1500 (50 wt) | 42 (crude) |
| $X_4$ | Ring tube-wall contact (in.) | 1 | 3 |
| $X_5$ | Ring coal composition | 200 mesh | 200 – 20 mesh (equal parts) |
| $X_6$ | Sealing fluid ratio (by volume) | 10:1 | 5:1 |
| $X_7$ | Operating pressure (psig) | 500 | 1000 |

TABLE 2.

THE $2^{7-4}$ FRACTIONAL FACTORIAL DESIGN WITH OBSERVED RESULTS

| Exper. No. | Operating Variables | | | | | | | Seal Time, sec |
|---|---|---|---|---|---|---|---|---|
| | 1 $X_1$ | 2 $X_2$ | 3 $X_3$ | 4=12 $X_4$ | 5=13 $X_5$ | 6=23 $X_6$ | 7=123 $X_7$ | |
| 1 | −1 | −1 | −1 | +1 | +1 | +1 | −1 | 34 |
| 2 | +1 | −1 | −1 | −1 | −1 | +1 | +1 | 45 |
| 3 | −1 | +1 | −1 | −1 | +1 | −1 | +1 | 90 |
| 4 | +1 | +1 | −1 | +1 | −1 | −1 | −1 | 45 |
| 5 | −1 | −1 | +1 | +1 | −1 | −1 | +1 | 35 |
| 6 | +1 | −1 | +1 | −1 | +1 | −1 | −1 | 30 |
| 7 | −1 | +1 | +1 | −1 | −1 | +1 | −1 | 19 |
| 8 | +1 | +1 | +1 | +1 | +1 | +1 | +1 | 20 |
| 9 | +1 | +1 | +1 | −1 | −1 | −1 | +1 | 19 |
| 10 | −1 | +1 | +1 | +1 | +1 | −1 | −1 | 40 |
| 11 | +1 | −1 | +1 | +1 | −1 | +1 | −1 | 36 |
| 12 | −1 | −1 | +1 | −1 | +1 | +1 | +1 | 14 |
| 13 | +1 | +1 | −1 | −1 | +1 | +1 | −1 | 37 |
| 14 | −1 | +1 | −1 | +1 | −1 | +1 | +1 | 35 |
| 15 | +1 | −1 | −1 | +1 | +1 | −1 | +1 | 90 |
| 16 | −1 | −1 | −1 | −1 | −1 | −1 | −1 | 22 |

To calculate the average effect on the seal time of any variable, multiply the level number by the corresponding seal time on the same line, sum the numbers algebraically, and divide the sum by 8, the number of "plus" signs in the column. For example, multiplying the level numbers in column $X_3$ by the corresponding seal times, summing, and dividing by 8 yields −23.125. This number represents the average loss in seal time when changing the seal fluid from 50-wt. oil to the lower viscosity crude oil. The effects of the remaining six variables were calculated using the same procedure and the results are shown in Table 3.

TABLE 3.
STATISTICAL ANALYSIS OF EXPERIMENTAL RESULTS

| Variable Name | Level Change | | Average Effect |
|---|---|---|---|
| | −1 | to +1 | sec |
| Compaction pressure (psi) | 2000 | 3000 | 4.125 |
| Ram vent | Open | Closed | −.125 |
| Sealing fluid viscosity (ssu) | 1500 (50 wt) | 42 (crude) | −23.125 |
| Ring tube-wall contact (inches) | 1 | 3 | 7.375 |
| Ring coal composition | 200 mesh | 200 − 20 mesh (equal parts) | 12.375 |
| Sealing fluid ratio (by Vol.) | 10:1 | 5:1 | −16.375 |
| Operating pressure (psig) | 500 | 1000 | 10.625 |
| Average seal time, 38.2 sec | | | |

The invention has been described in connection with specific procedures, but many modifications can be made within the spirit and scope of the invention. Such modifications may be necessary, particularly where the method of the inventions are to be adapted for use in connection with other processes, for example, a process wherein solid particles are to be injected into a pipe line under high pressure. It is apparent that part or all of the disclosed or suggested procedures can be performed by fully automatic means, thus providing a fully automated coal gasification, liquefaction or other plant. While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

We claim:

1. A method of feeding a material comprising solid particles from a first region at a first pressure to a second region at a substantially different second pressure, comprising conveying the material from the first region into an elongate tube connected to communicate between the first region and the second region, providing a plurality of movable sealing zones in the tube, each sealing zone comprising a mixture of solid particles and an added liquid contacting the inner wall of the tube, to provide a substantially fluid-tight seal between the second region and at least a substantial portion of the tube communicating with the first region while the material is being conveyed from the first region into the tube, forcing the material and sealing zones through the tube toward the second region, and conveying the material, and at least one of the sealing zones, from the tube into the second region by boring into the at least one sealing zone and the material with an auger and then retracting the auger into the second region.

2. A method as in claim 1, comprising reciprocating the auger axially in the tube, in a predetermined relation to the movement of the material and sealing zones being forced through the tube toward the second region.

3. A method as in claim 2, wherein said forcing of the material and sealing zones through the tube toward the second region is performed by moving a solid surface axially of the tube against the sealing zones and the material within the tube between the auger and the first region in synchronism with the retraction of the auger.

* * * * *